United States Patent [19]

Kim

[11] Patent Number: 5,675,669
[45] Date of Patent: Oct. 7, 1997

[54] APPARATUS FOR ENCODING/DECODING AN IMAGE SIGNAL HAVING A STILL OBJECT

[75] Inventor: Jong-Rak Kim, Seoul, Rep. of Korea

[73] Assignee: Daewoo Electronics, Co., Ltd., Seoul, Rep. of Korea

[21] Appl. No.: 529,479

[22] Filed: Sep. 18, 1995

[30] Foreign Application Priority Data

Mar. 20, 1995 [KR] Rep. of Korea ............... 95-5870

[51] Int. Cl.⁶ .................. G06K 9/39; G06K 9/48
[52] U.S. Cl. .................. 382/241; 382/242; 382/233
[58] Field of Search .................. 382/241, 242, 382/246, 248, 173, 199, 282, 283, 233; 348/410; 395/141, 142, 143

[56] References Cited

U.S. PATENT DOCUMENTS 5,295,201  3/1994  Yokohama ........................ 382/241
5,592,228  1/1997  Dachiku et al. ................... 382/241
5,608,458  3/1997  Chen et al. ....................... 348/413

*Primary Examiner*—Leo Boudreau
*Assistant Examiner*—Phuoc Tran
*Attorney, Agent, or Firm*—Pennie and Edmonds, LLP

[57] ABSTRACT

An encoding system effectively reduces the substantial amount of data for transmission by way of employing three encoding channels which perform a compression process for individually extracting and coding the contour of the approximated foreground region consisting of a still object, the boundary pixel values of the pixels located on the contour and the leveled-down/trimmed pixel data corresponding to the contour and the boundary pixel values. Further, a decoding system for use with the encoding system serves to effectively perform a decoding process for a coded image signal by using three decoding channels containing the decoding path for restoring pixel information including a set of reconstructed boundary pixel values and reconstructed contour information.

9 Claims, 3 Drawing Sheets

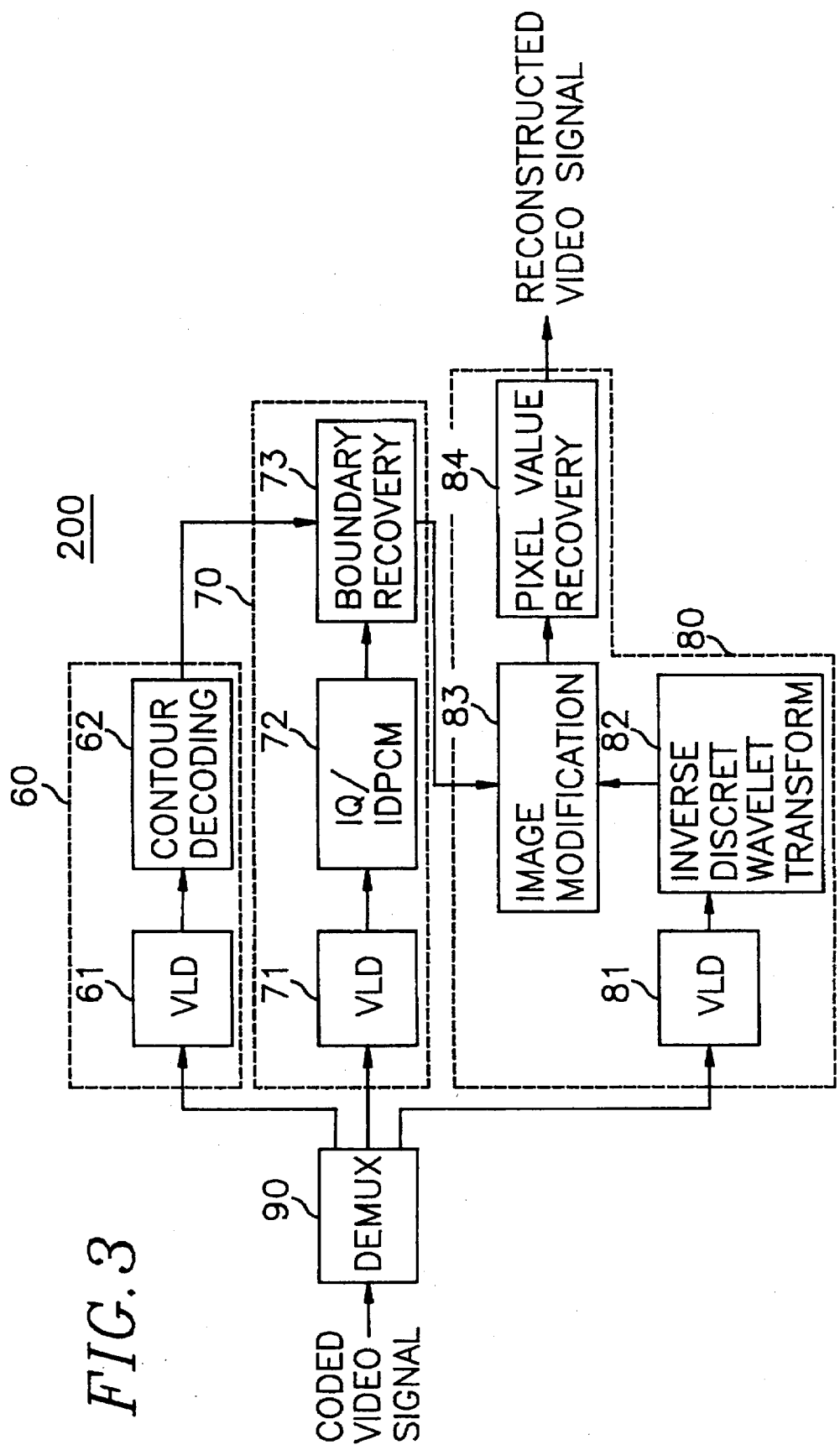

APPARATUS FOR ENCODING/DECODING AN IMAGE SIGNAL HAVING A STILL OBJECT

FIELD OF THE INVENTION

The present invention relates to an apparatus for encoding/decoding an image signal and, more particularly, to an apparatus for encoding/decoding an image signal having a still object in an effective manner.

DESCRIPTION OF THE PRIOR ART

In a digital television system such as video-telephone, teleconference or high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially in the case of such low bit-rate image signal encoders as those used in video-telephone and teleconference systems.

One of such methods for encoding image signals for a low bit-rate encoding system is the so-called object-oriented analysis-synthesis coding technique(see Michael Hötter, "Object-Oriented Analysis-Synthesis Coding Based on Moving Two-Dimensional Objects", *Signal Processing: Image Communication*, 2, No. 4, pp. 409–428(December, 1990)).

According to the object-oriented analysis-synthesis coding technique, an input video image, which has moving objects, is divided according to the objects; and three sets of parameters for defining the motion, contour and pixel data of each object are processed through different encoding channels.

In case of processing an image signal having a "still object", which may be used for particular purposes, e.g., home shopping or electrical cataloging, and has no significant movement, a method for reducing only the spatial redundancies contained in the image signal, i.e., the so-called intra coding method, is mainly employed in the object-oriented analysis-synthesis coding technique.

Even though it is possible to reduce the amount of video data to be transmitted by utilizing the spatial redundancies contained in the image signal having the still object, however, it may still be required to further reduce the volume of image data, especially, in a low-bit rate codec system having, e.g., 64 kb/s transmission channel bandwidth.

SUMMARY OF THE INVENTION

It is, therefore, an object of the present invention to provide an apparatus for encoding an image signal having a still object with an improved compression rate.

Another object of the present invention is to provide an apparatus for decoding an encoded image signal having a still object in an effective manner.

In accordance with one embodiment of the invention, there is provided an apparatus for encoding an image signal having foreground and background regions, wherein the foreground region consists of a still object and the image signal includes contour information relative to the positions of the pixels located on the contour of the foreground region and pixel information containing the pixel values of the foreground and the background regions in the image signal, which comprises:

first encoding means, based on the contour information, for approximating the contour of the foreground region to provide contour data representing the contour of the approximated foreground region and for converting the contour data into a coded contour signal;

second encoding means, based on the pixel information and the contour data, for masking the values of the pixels lying outside the approximated foreground region with a zero value to generate a zero-masked pixel signal and for extracting a set of boundary pixel values of the pixels located on the contour of the approximated foreground region from the zero-masked pixel signal to generate a coded boundary signal representing the set of boundary pixel values;

third encoding means, based on the set of boundary pixel values, for leveling down the pixel values of the approximated foreground region and, based on the contour data, for trimming a portion of the background region to generate a coded pixel signal; and means for combining the coded contour signal, the coded boundary signal and the coded pixel signal to generate a coded image signal.

In accordance with another embodiment of the invention, there is provided an apparatus for converting a coded image signal to a reconstructed image signal, wherein the coded image signal includes a coded contour signal, a coded boundary signal and a coded pixel signal, which comprises:

means for demultiplexing the coded image signal into the coded contour signal, the coded boundary signal and the coded pixel signal;

first decoding means, in response to the coded contour signal, for generating reconstructed contour information representing the contour of the foreground region in the coded image signal;

second decoding means, in response to the reconstructed contour information, for converting the coded boundary signal to a set of reconstructed boundary pixel values of the pixels located on the contour of the foreground region; and third decoding means, in response to the set of reconstructed boundary pixel values and the reconstructed contour information, for converting the coded pixel signal to the reconstructed image signal.

BRIEF DESCRIPTION OF THE DRAWINGS

The above and other objects and features of the present invention will become apparent from the following description of preferred embodiments given in conjunction with the accompanying drawings, in which:

FIG. 3 is a schematic block diagram depicting a decoding system for use with the encoding system of FIG. 1.

DETAILED DESCRIPTION OF THE PREFERRED EMBODIMENTS

Figure 1:
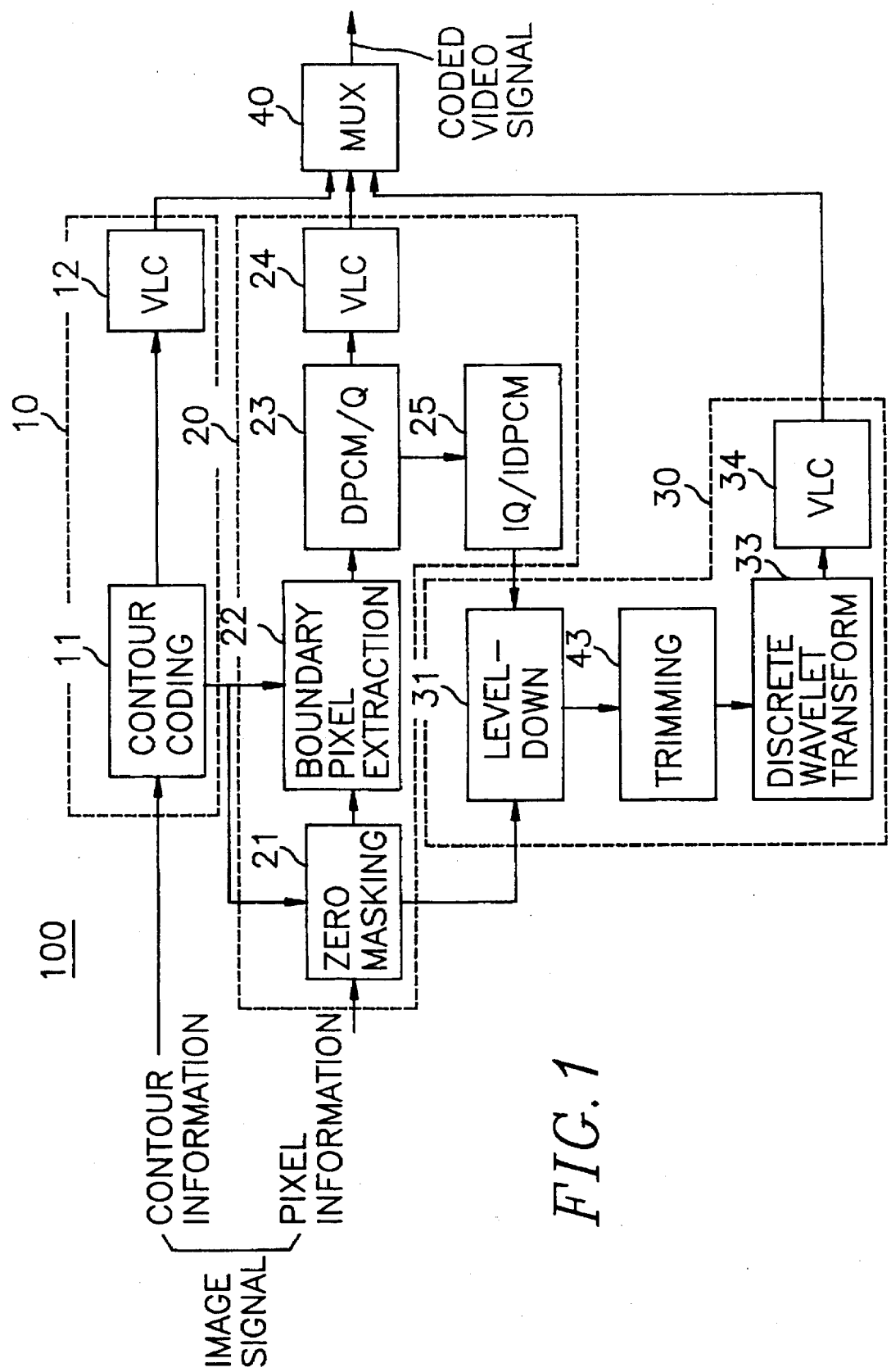
FIG. 1 is a schematic block diagram illustrating an encoding system in accordance with the present invention.

Referring to FIG. 1, there is shown an encoding system in accordance with the present invention. The encoding system 100 includes a first encoding channel 10, a second encoding channel 20 and a third encoding channel 30.

The first encoding channel 10 serves to receive an image signal from a known image source, e.g., a hard disk or compact disk for use in a home shopping system (not shown), in order to generate a coded contour signal. The image signal includes pixel information representative of a plurality of pixel values and contour information representing position data of the pixels located on the contour of a foreground region. The foreground region consists of a still object which has no motion. The contour information can be obtained by using a known edge detection technique employing a known edge detection operator, e.g., a sobel operator and is pre-stored in the hard disk (not shown). The pixel information also includes a background region lying outside the foreground region. In order to encode the contour information, the first encoding channel 10 includes a contour coding circuit 11, and a variable length coder 12.

The contour information is coupled to the contour coding circuit 11 which converts the contour information to contour data representing the contour of an approximated foreground region by using, e.g., a known polygonal approximation and a discrete sine transform(DST). The contour data is then coupled to the variable length coder 12 and the second coding channel 20.

The variable length coder 12, as is well known in the art, serves to convert the contour data to a statistically coded contour signal which is coupled to a multiplexer 40.

The pixel information is coupled to the second encoding channel 20 which serves to generate a coded boundary signal through the use of the contour data; and includes a zero masking circuit 21, a boundary pixel extraction circuit 22, a differential pulse code modulation/quantization circuit (DPCM/Q) 23, a variable length coder(VLC) 24 and an inverse quantization/differential pulse code demodulation (IQ/IDPCM) circuit 25.

The zero masking circuit 21 serves to mask the pixel values of the pixels lying outside the approximated foreground region of the pixel information with a zero value by using the contour data in order to generate a zero-masked pixel signal. That is, the values of the pixels located in the background region of the pixel information are masked by using zero-values. The zero-masked pixel signal is then coupled to the boundary pixel extraction circuit 22 and the third encoding channel 30.

The boundary pixel extraction circuit 22 serves to serially extract the values of the pixels located on the contour of the approximated foreground region from the zero-masked pixel signal by using the contour data to thereby generate a set of boundary pixel values. The set of boundary pixel values is then coupled to the DPCM/Q circuit 23.

At the DPCM/Q circuit 23, the set of boundary pixel values is converted in a one-dimensional form to a differential pulse code modulated boundary signal which is coupled to the variable length coder 24 and the IQ/IDPCM circuit 25.

The differential pulse code modulated boundary signal is converted into a statistically coded boundary signal by the variable length coder 24. The coded boundary signal is then coupled to the multiplexer 40. On the other hand, the IQ/IDPCM circuit 25 serves to convert the differential pulse code modulated boundary signal back to a set of reconstructed boundary pixel values which is coupled to the third encoding channel 30.

The third encoding circuit 30 serves to receive the zero-masked pixel signal and the set of reconstructed boundary pixel values in order to convert the zero-masked pixel signal to a coded pixel signal. In order to carry out the conversion, the third encoding circuit 30 includes a level-down circuit 31, a trimming circuit 32, a discrete wavelet transform circuit 33 and a variable length coder 34.

The level-down circuit 31 receives the zero-masked pixel signal and the set of reconstructed boundary pixel values; and serves to lower the pixel values of the pixels located on the approximated foreground region by using the set of reconstructed boundary pixel values in order to generate a leveled-down pixel signal which has an increased spatial correlation among the values of the pixels contained in the zero-masked pixel signal.

The leveled-down pixel signal is then coupled to the trimming circuit 32 which serves to trim a portion of the background of the leveled-down pixel signal to generate a rectangular trimmed pixel signal, wherein the rectangular trimmed pixel signal includes the approximated foreground region and the trimmed background region. Therefore, the pixels in the trimmed pixel signal are arranged in a two-dimensional rectangular region which encompasses the approximated foreground region with a minimum number of pixels and the rectangular trimmed pixel signal can be preferably employed in a known transform coding, e.g., wavelet transform, as will be described hereinafter, to thereby further reducing the volume of the image data to be transmitted.

The discrete wavelet transform circuit 33 serves to convert the trimmed pixel signal into a wavelet transformed pixel signal. The discrete wavelet transform circuit 33 employs a well known wavelet transform coding algorithm which is disclosed in, e.g., an article by Stephan G. Mallat, "A Theory for Multiresolution Signal Decomposition: The Wavelet Representation", *IEEE Transactions on Pattern Analysis and Machine Intelligence*, 11, No.7, July, 1989. As can be seen from the above, as the zero-masked pixel signal is leveled down and trimmed, the image data to be transmitted can be effectively reduced.

The wavelet transformed pixel signal is then coupled to the variable length coder 34 which converts it to a statistically coded pixel signal which is coupled to the multiplexer 40.

Consequently, the multiplexer 40 serves to combine the coded contour signal, the coded boundary signal and the coded pixel signal to thereby generate a coded image signal under the control of a conventional controller, e.g., microprocessor (not shown). The coded image signal is then transmitted via a transmission channel, for example, a cable transmission line, to a decoder system as described hereinafter.

Figure 2A:
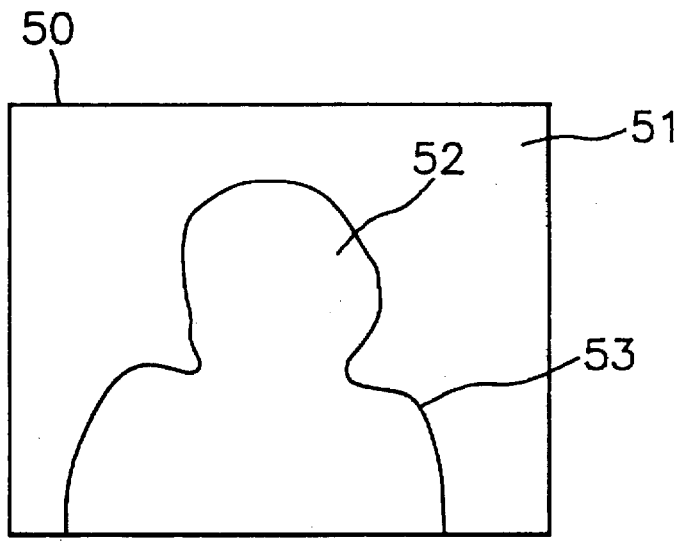
FIGS. 2A, 2B and 2C are exemplary diagrams showing the encoding process of an image signal having a still object.
Figure 2B:
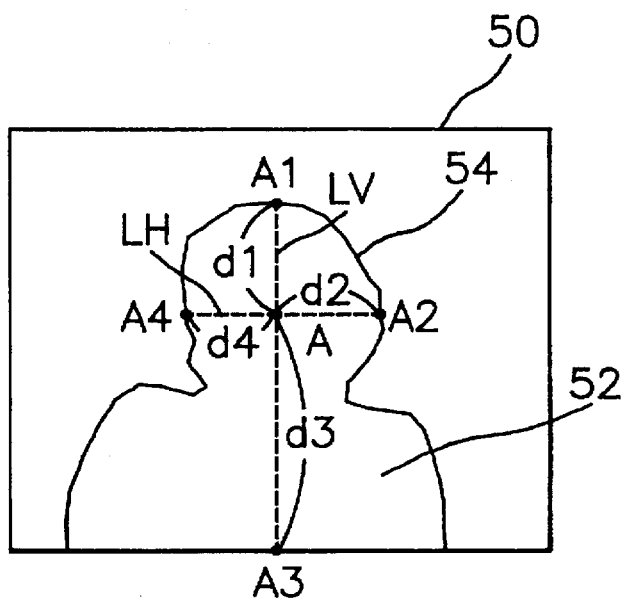
Figure 2C:
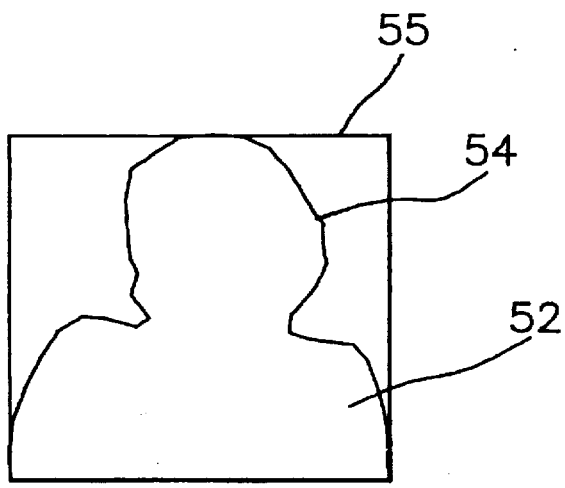

Referring to FIGS. 2A, 2B and 2C, there are provided exemplary diagrams showing the encoding process of the image signal. As shown in FIG. 2A, the image signal 50 includes a background region 51 and a foreground region 52 which consists of a still object and is defined by a contour line 53. As is well known in the art, the image signal also includes pixel information having a plurality of pixel values which, for the sake of simplicity, are not individually designated herein; and contour information representative of the positions of the pixels located on the contour line 53.

The contour line 53 consists of a set of pixels. The approximated contour line 54 shown in FIG. 2B is obtained at the contour coding circuit 11 (shown in FIG. 1) employing the polygonal approximation and the discrete sine transform in order to reduce the contour information, wherein the approximated contour line 54 serves to form the approximated foreground region 52'. Thereafter, as described above, the values of the pixels lying outside the approximated foreground region are masked with zero at the zero masking circuit 21 shown in FIG. 1. The set of boundary pixel values of the pixels located on the approximated contour line 54 is then extracted and encoded at the second encoding channel 20.

On the other hand, at the level-down circuit 31 shown in FIG. 1, the values of the pixels contained in the approximated foreground region 52' are leveled-down by using the set of boundary pixel values in order to increase the spatial correlation or redundancies between the pixels of the background region 51 and those of the approximated foreground region 52'. For example, the value of a target pixel A contained in the approximated foreground region 52' is subtracted with a level-down value H. The level-down value H is determined by using four boundary pixel values of corresponding boundary pixels A1, A2, A3, A4 and distances d1, d2, d3, d4 evaluated between each of the positions of the corresponding boundary pixel values A1, A2, A3, A4 and that of the target pixel value A, wherein the pixels of the boundary pixel values A1 and A3 are located on the approximated contour line 54 and intersected a vertical line LV running through the position of the target pixel value A, and the pixels of the boundary pixel value A2 and A4 are located on the approximated contour line 54 and intersected a horizontal line LH running through the position of the target pixel value A. The level down value H may be represented as follows:

$$H = \text{round}((Hv+Hh)/2)$$

wherein $Hv=(d3 \times A1+d1 \times A3)/(d1+d3)$; $Hh=(d2 \times A4+d4 \times A2)/(d2+d4)$; and round( ) is an operator which raises a fraction not lower than 0.5 to a unit.

In a same manner, each of the values of the pixels contained in the approximated foreground region 52' is lowered or leveled-down by using corresponding boundary pixel values. As a result, the difference between the pixel values of the pixels contained in the foreground region and the pixel values of the pixels contained in the background region can be effectively reduced to thereby increase the spatial correlation in the zero-masked pixel signal.

The image signal (as the zero-masked pixel signal) 50, at the trimming circuit 32 shown in FIG. 1, is then trimmed and converted to the rectangular trimmed pixel signal 55 which encompasses the approximated foreground region 52' with a minimum number of pixels, as shown in FIG. 2C. That is, the values of the pixels contained in the trimmed pixel signal are arranged in a two-dimensional rectangular region which encompasses the still object region 52. The rectangular trimmed pixel signal can be used for the conventional transform coding process at the discrete wavelet transform circuit 33 shown in FIG. 1. Therefore, it should be appreciated that the encoding system in accordance with the present invention is capable of reducing the substantial amount of data for transmission by way of employing a compression technique for individually extracting and coding the contour of the approximated foreground region, the boundary pixel values of the pixels located on the approximated contour and the leveled-down/trimmed pixel data corresponding to the approximated contour and the boundary pixel values.

Referring now to FIG. 3, there is provided a decoding system in accordance with the present invention. The decoding system 200 serves to decode the coded image signal comprising the coded contour signal, the coded boundary signal and the coded pixel signal; and includes a first decoding channel 60, and a second decoding channel 70 and a third decoding channel 80.

The coded image signal having the coded contour signal, the coded boundary signal and the coded pixel signal is coupled via the transmission channel to the decoding system 200. The coded contour signal is coupled via a demultiplexer 90 to the first decoding channel 60 for generating reconstructed contour information, wherein the first decoding channel 60 includes a variable length decoder 61 and a contour decoding circuit 62.

The coded contour signal is coupled to the variable length decoder 61 which serves to convert the coded contour signal into reconstructed contour data representing the contour of an approximated foreground region in the coded image signal.

The contour decoding circuit 62 receives the reconstructed contour data and serves to convert the contour data to the reconstructed contour information by using, e.g., a known inverse discrete sine transform. The reconstructed contour information is coupled to the second decoding channel 70.

The second decoding circuit 70 receives the coded boundary signal and the reconstructed contour information, and serves to generate a set of restored or reconstructed boundary pixel values. For the purpose of obtaining the set of restored boundary pixel values, the second decoding circuit 70 includes or employs a variable length decoder 71, an inverse quantization/differential pulse code demodulation (IQ/IDPCM) circuit 72, and a boundary recovery circuit 73.

The coded pixel signal is coupled via the demultiplexer 90 to the variable length decoder 71 which serves to convert the coded boundary signal to the differential pulse code modulated boundary signal. The differential pulse code modulated boundary signal is then coupled to the IQ/IDPCM circuit 72 which serves to convert it to the set of restored boundary pixel values which is coupled to the boundary recovery circuit 73. The boundary recovery circuit 73 receives the set of restored boundary pixel values and the reconstructed contour information, and serves to combine the set of the restored boundary pixel values and the reconstructed contour information in order to generate boundary pixel information having the set of reconstructed boundary pixel values and the corresponding set of boundary pixel positions. The boundary pixel information is then coupled to the third decoding circuit 80.

The third decoding channel 80 receives the coded pixel signal and the boundary pixel information, and serves to generate reconstructed pixel information. The third decoding channel 80 includes a variable length decoder 81, an inverse discrete wavelet transform circuit 82, an image modification circuit 83 and a pixel value recovery circuit 84.

The coded pixel signal is coupled through the demultiplexer 90 to the variable length decoder 81 which serves to convert the coded pixel signal to the wavelet transformed pixel signal. The inverse discrete wavelet transform circuit 82 receives the wavelet transformed pixel signal and serves to convert it to the trimmed pixel signal which is then coupled to the image modification circuit 83.

The image modification circuit 83 serves to recover the leveled-down pixel signal by using the reconstructed boundary pixel information. The leveled-down pixel signal is then coupled to the pixel value recovery circuit 84 which serves to heighten the pixel values of the foreground region in the leveled-down pixel signal by using the set of reconstructed boundary pixel values of the boundary pixel information. The reconstructed contour information and the reconstructed pixel information are combined as a reconstructed image signal which is then coupled to a next processing apparatus, for example, a display apparatus or hard disk.

As may be seen from the above, the encoding system in accordance with the present invention can substantially reduce the amount of data for transmission by way of employing a compression technique for individually extracting and coding the contour of the approximated foreground region consisting of a still object, the boundary pixel values of the pixels located on the approximated contour and the leveled-down/trimmed pixel data corresponding to the approximated contour and the boundary pixel values. Further, the inventive decoding system serves to effectively perform the decoding process for a coded image signal by using three decoding channels containing a decoding path for restoring the pixel information corresponding to the set of reconstructed boundary pixel values and the reconstructed contour information. The coded contour signal, the coded boundary signal and the coded pixel signal also can be simultaneously processed through the use of three processing paths and one multiplexer without having to use any complicated or additional components.

While the present invention has been described with respect to the particular embodiments, it will be apparent to those skilled in the art that various changes and modifications may be made without departing from the spirit and the scope of the invention as defined in the following claims.

What is claimed is:

1. An apparatus for encoding an image signal having foreground and background regions, wherein the foreground region consists of a still object and the image signal includes contour information relative to the positions of the pixels located on the contour of the foreground region and pixel information containing the pixel values of the foreground and the background regions in the image signal, which comprises:

first encoding means, based on the contour information, for approximating the contour of the foreground region to provide contour data representing the contour of an approximated foreground region and for converting the contour data into a coded contour signal;

second encoding means, based on the pixel information and the contour data, for masking the values of the pixels lying outside the approximated foreground region with a zero value to generate a zero-masked pixel signal and for extracting a set of boundary pixel values of the pixels located on the contour of the approximated foreground region from the zero-masked pixel signal to generate a coded boundary signal representing the set of boundary pixel values;

third encoding means, based on the set of boundary pixel values, for leveling down the pixel values of the approximated foreground region and, based on the contour data, for trimming a portion of the background region to generate a coded pixel signal; and means for combining the coded contour signal, the coded boundary signal and the coded pixel signal to generate a coded image signal.

2. The apparatus as recited in claim 1, wherein the first encoding means includes:

means, based on the contour information, for approximating the contour of the foreground region to provide the contour data; and a variable length coder for statistically coding the contour data to form the coded contour signal.

3. The apparatus as recited in claim 2, wherein the second encoding means includes:

masking means, based on the contour data, for masking the values of the pixels lying outside the approximated foreground region with a zero value to generate the zero-masked pixel signal;

extraction means, based on the contour data, for extracting the values of the pixels located on the contour of the approximated foreground region from the zero-masked pixel signal to generate the set of boundary pixel values;

conversion means for converting the set of boundary pixel values to a differential pulse code modulated boundary signal;

inverse conversion means for converting the differential pulse code modulated boundary signal back to the set of boundary pixel values; and a variable length coder for statistically coding the differential pulse code modulated boundary signal to generate the coded boundary signal.

4. The apparatus as recited in claim 3, wherein the third encoding means includes:

leveling-down means, based on the set of boundary pixel values, for subtracting the pixel values of the approximated foreground region with predetermined level-down values to generate a leveled-down pixel signal, wherein the predetermined level-down values are calculated by using the set of boundary pixel values;

means, based on the contour data, for trimming a portion of the zero-masked pixel signal to generate the trimmed pixel signal, wherein the pixels of the trimmed pixel signal are arranged in a two-dimensional rectangular region which encompasses the approximated foreground region with a minimum number of pixels;

means for converting the trimmed pixel signal to a wavelet transformed pixel signal; and a variable length coder for statistically coding the wavelet transformed pixel signal to generate the coded pixel signal.

5. The apparatus as recited in claim 4, wherein each of said predetermined level-down values corresponds to each of the pixel values of the approximated foreground region and is determined as follows:

$$H=round((Hv+Hh)/2)$$

wherein H is a predetermined level-down value for a corresponding pixel in the approximated foreground region; $Hv=(d3 \times A1+d1 \times A3)/(d1+d3)$; $Hh=(d2 \times A4+d4 \times A2)/(d2+d4)$; round( ) is an operator which raises a fraction not lower than 0.5 to a unit; A1 and A3 are boundary pixel values representing the values of the two pixels located at the intersecting points between the contour and a vertical line running through the corresponding pixel; A2 and A4 are boundary pixel values representing the values of the two pixels located at the intersecting points between the contour and a horizontal line running through the corresponding pixel; d1, d2, d3 and d4 are distances between the positions of the boundary pixels values A1, A2, A3, A4 and that of the corresponding pixel, respectively.

6. An apparatus for converting a coded image signal to a reconstructed image signal, wherein the coded image signal includes a coded contour signal, a coded boundary signal and a coded pixel signal, which comprises:

means for demultiplexing the coded image signal into the coded contour signal, the coded boundary signal and the coded pixel signal;

first decoding means, based on the coded contour signal, for generating reconstructed contour information representing the contour of the foreground region of the coded image signal;

second decoding means, based on the reconstructed contour information, for converting the coded boundary signal to a set of reconstructed boundary pixel values of the pixels located on the contour of a foreground region; and third decoding means, in response to the set of reconstructed boundary pixel values and the reconstructed contour information, for converting the coded pixel signal to the reconstructed image signal.

7. The apparatus as recited in claim 6, wherein the first decoding means includes:

a variable length decoder for converting the coded contour signal to the reconstructed contour data representing the contour of an approximated foreground region; and conversion means for converting the reconstructed contour data to the reconstructed contour information.

8. The apparatus as recited in claim 7, wherein the second decoding means includes:

a variable length decoder for converting the coded boundary signal to a differential pulse code modulated boundary signal;

inverse conversion means for converting the differential pulse code modulated boundary signal to the set of reconstructed boundary pixel values; and means for generating boundary pixel information including the set of reconstructed boundary pixel values and the reconstructed contour information.

9. The apparatus as recited in claim 8, wherein the third decoding means includes:

a variable length decoder for converting the coded pixel signal to a wavelet transformed pixel signal;

inverse conversion means for converting the wavelet transformed pixel signal to a trimmed pixel signal;

means, based on the reconstructed contour information, for modifying the trimmed pixel signal to a leveled-down pixel signal; and means, based on the boundary pixel information, for heightening the pixel values of the foreground region in the leveled-down image signal to generate the reconstructed image signal.

* * * * *